United States Patent
Hsu et al.

(10) Patent No.: US 9,052,071 B2
(45) Date of Patent: Jun. 9, 2015

(54) ILLUMINATION DEVICE HAVING LIGHT-GUIDING STRUCTURE

(71) Applicant: NATIONAL CHIAO TUNG UNIVERSITY, Hsinchu (TW)

(72) Inventors: Ray-Quen Hsu, Hsinchu (TW); Shao-Hua Wei, Taipei (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 13/952,747

(22) Filed: Jul. 29, 2013

(65) Prior Publication Data
US 2014/0340893 A1    Nov. 20, 2014

(30) Foreign Application Priority Data

May 15, 2013 (TW) .............................. 102117199 A (51) Int. Cl.
| | |
|---|---|
| F21V 3/02 | (2006.01) |
| F21K 99/00 | (2010.01) |
| F21V 5/04 | (2006.01) |
| F21V 7/00 | (2006.01) |
| G02B 6/00 | (2006.01) |
| F21V 3/00 | (2006.01) |
| F21Y 101/02 | (2006.01) |

(52) U.S. Cl.
CPC ... *F21K 9/52* (2013.01); *F21V 3/00* (2013.01); *F21K 9/00* (2013.01); *F21V 5/04* (2013.01); *F21V 7/0091* (2013.01); *G02B 6/00* (2013.01); *F21Y 2101/02* (2013.01)

(58) Field of Classification Search
USPC ............ 362/555, 558, 559, 511, 650, 311.02, 362/311.06, 327, 339
See application file for complete search history.

(56) References Cited

U.S. PATENT DOCUMENTS

| | | | | |
|---|---|---|---|---|
| 2,724,766 A | * | 11/1955 | Suther et al. ................... | 362/560 |
| 4,084,215 A | * | 4/1978 | Willenbrock ................. | 362/470 |
| 4,826,273 A | * | 5/1989 | Tinder et al. .................. | 362/488 |
| 5,438,485 A | * | 8/1995 | Li et al. ........................ | 362/558 |

(Continued)

FOREIGN PATENT DOCUMENTS

| | | |
|---|---|---|
| JP | 2003-90920 A | 3/2003 |
| JP | 2009-289697 A | 12/2009 |
| TW | 201102563 A1 | 1/2011 |

OTHER PUBLICATIONS

Shao-Hua Wei, The Secondary Optics Lens Design for Omni-directional LED Lamp, Thesis for Master's Degree, National Chiao Tung University, Jan. 18, 2013.

*Primary Examiner* — Ismael Negron
(74) *Attorney, Agent, or Firm* — Li & Cai Intellectual Property (USA) Office (57) ABSTRACT

A light-emitting device includes a base unit, a light-guiding structure with a single light-guiding element disposed on the base unit, and a cover unit having a light-transmitting cover body disposed on the base unit to cover the light-guiding structure. The light-guiding element includes a columnar body having a vertical surrounding peripheral face and a light input surface for receiving light from the light emitting unit, and an expansion body integrally and upwardly extended from the columnar body. The expansion body has a surrounding bottom surface connected with the vertical surrounding peripheral surface, an inclined surrounding peripheral surface connected with the surrounding bottom surface, and a trumpet-shaped top surface connected with the inclined surrounding peripheral surface.

10 Claims, 10 Drawing Sheets

(56) References Cited

U.S. PATENT DOCUMENTS

| | | | |
|---|---|---|---|
| 7,275,849 B2 * | 10/2007 | Chinniah et al. | 362/555 |
| 7,753,561 B2 * | 7/2010 | Chaves et al. | 362/308 |
| 8,292,472 B2 * | 10/2012 | Huang | 362/327 |
| 8,480,265 B2 * | 7/2013 | Hsueh et al. | 362/296.05 |
| 8,506,112 B1 * | 8/2013 | Dau et al. | 362/217.05 |
| 8,523,407 B2 * | 9/2013 | Huang et al. | 362/327 |
| 8,727,574 B2 * | 5/2014 | Simchak et al. | 362/299 |
| 8,833,969 B2 * | 9/2014 | Speier et al. | 362/236 |
| 2005/0063169 A1 * | 3/2005 | Erber | 362/31 |
| 2008/0297918 A1 | 12/2008 | Park et al. | |

* cited by examiner

ILLUMINATION DEVICE HAVING LIGHT-GUIDING STRUCTURE

BACKGROUND OF THE INVENTION

1. Field of the Invention

The instant disclosure relates to a light-guiding structure and a light-emitting device, and more particularly to a light-guiding structure and a light-emitting device for increasing the viewing angle (i.e., the illumination angle).

2. Description of Related Art

Because the LED (Light Emitting Diode) offers advantages of power savings, high emission efficiency and long life, it is widely used in various applications, such as traffic control devices, electronic billboards, light of transportation, flashlights, and illumination devices. One problem posed by use of an LED in an illumination device is that the characteristics of an LED are different from a conventional bulb. That is, a conventional bulb is a surface light source, while an LED is a point light source. Therefore, a conventional bulb can provide a 360 degree is viewing angle, but an LED can only provide a 120 to 140 degree viewing angle. Conventional techniques for overcoming this limitation include utilizing secondary optics, arranging the LEDs or polishing the lamp cover for covering the LEDs. However, even when utilizing secondary optics or providing a polished lamp cover, a conventional LED illumination device is still limited to providing a 160 degree viewing angle. People skilled in the art often arrange or assemble the LEDs to extend the viewing angle.

SUMMARY OF THE INVENTION

One aspect of the instant disclosure relates to a light-guiding structure and a light-emitting device for increasing the viewing angle over 180 degrees.

One of the embodiments of the instant disclosure provides a light-guiding structure, comprising a light-guiding unit and a light-emitting unit. The light-guiding unit includes a single light-guiding element, wherein the single light-guiding element has a columnar body and an expansion body integrally and upwardly extended from the columnar body, the columnar body has a light input surface and a vertical surrounding peripheral surface, and the expansion body has a surrounding bottom surface connected with the vertical surrounding peripheral surface, an inclined surrounding peripheral surface connected with the surrounding bottom surface, and a trumpet-shaped top surface connected with the inclined surrounding peripheral surface. The light-emitting unit includes at least one light-emitting module adjacent to the light input surface of the columnar body.

Another one of the embodiments of the instant disclosure provides a light-emitting device, comprising a base unit, a light-guiding structure and a cover unit. The light-guiding structure is disposed on the base unit, wherein the light-guiding structure includes a light-guiding unit and a light-emitting unit. The cover unit includes a light-transmitting cover body disposed on the base unit to cover the light-guiding structure. The light-guiding unit includes a single light-guiding element, the single light-guiding element has a columnar body and an expansion body integrally and upwardly extended from the columnar body, the columnar body has a light input surface and a vertical surrounding peripheral surface, and the expansion body has a surrounding bottom surface connected with the vertical surrounding peripheral surface, an inclined surrounding peripheral surface connected with the surrounding bottom surface, and a trumpet-shaped top surface connected with the inclined surrounding peripheral surface, wherein the light-emitting unit includes at least one light-emitting module adjacent to the light input surface of the columnar body.

Therefore, because the single light-guiding element has a columnar body and an expansion body integrally and upwardly extended from the columnar body, the viewing angle of the light-guiding structure and the light-emitting device of the instant disclosure can be increased over 180 degrees.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

Referring to FIG. 1 to FIG. 6, where the instant disclosure provides a light-guiding structure M, comprising a light-guiding unit 1 and a light-emitting unit 2.

Referring to FIG. 1 to FIG. 4, the light-guiding unit 1 includes a single light-guiding element 10. For example, the single light-guiding element 10 may be a one-piece TIR (Total Internal Reflection) lens formed by an integral forming process. In addition, the single light-guiding element 10 has a columnar body 10A and an expansion body 10B integrally and upwardly extended from the columnar body 10A. The columnar body 10A has a light input surface 100A and a vertical surrounding peripheral surface 101A, and the expansion body 10B has a surrounding bottom surface 100B connected with the vertical surrounding peripheral surface 101A, an inclined surrounding peripheral surface 101B connected with the surrounding bottom surface 100B, and a trumpet-shaped top surface 102B connected with the inclined surrounding peripheral surface 101B.

More precisely, the single light-guiding element 10 has a first arc-shaped surrounding corner surface 101C, a second arc-shaped surrounding corner surface 102C and a third arc-shaped surrounding corner surface 103C. In addition, the vertical surrounding peripheral surface 101A of the columnar body 10A and the surrounding bottom surface 100B of the expansion body 10B are connected with each other through the first arc-shaped surrounding corner surface 101C. The surrounding bottom surface 100B of the expansion body 10B and the inclined surrounding peripheral surface 101B of the expansion body 10B are connected with each other through the second arc-shaped surrounding corner surface 102C. The inclined surrounding peripheral surface 101B of the expansion body 10B and the trumpet-shaped top surface 102B of the expansion body 10B are connected with each other through the third arc-shaped surrounding corner surface 103C. Moreover, the vertical surrounding peripheral surface 101A, the surrounding bottom surface 100B, the inclined surrounding peripheral surface 101B, the trumpet-shaped top surface 102B, the first arc-shaped surrounding corner surface 101C, the second arc-shaped surrounding corner surface 102C and the third arc-shaped surrounding corner surface 103C are smooth surfaces (i.e., there is no any rough structure on the smooth surfaces).

Figure 1:
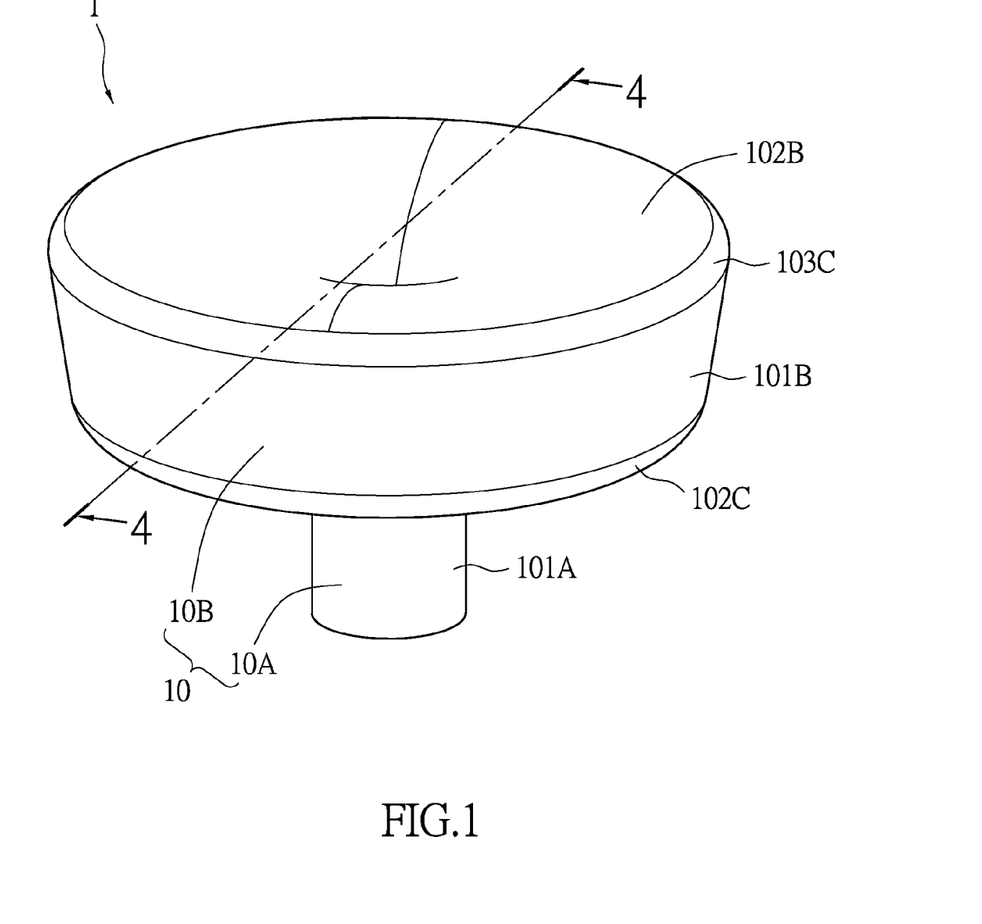
FIG. 1 shows a perspective, schematic view of the light-guiding unit of the instant disclosure.
Figure 2:
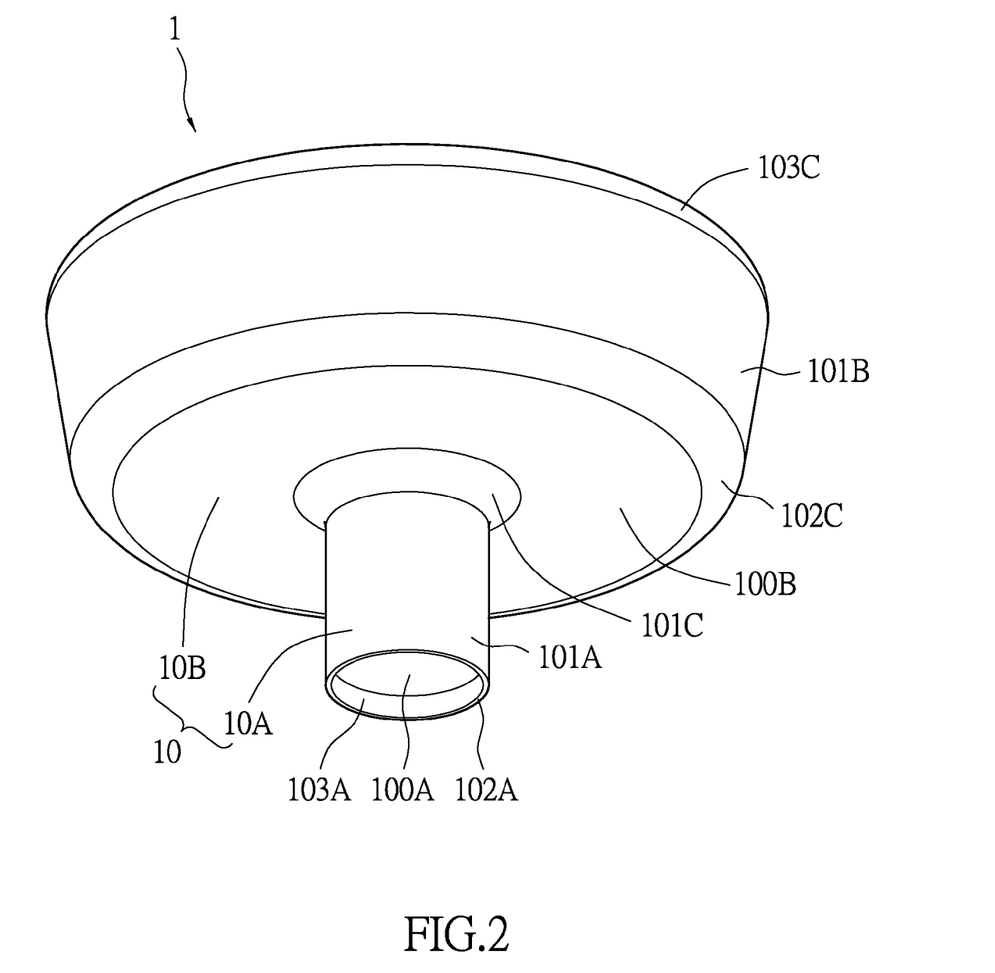
FIG. 2 shows another perspective, schematic view of the light-guiding unit of the instant disclosure.
Figure 3:
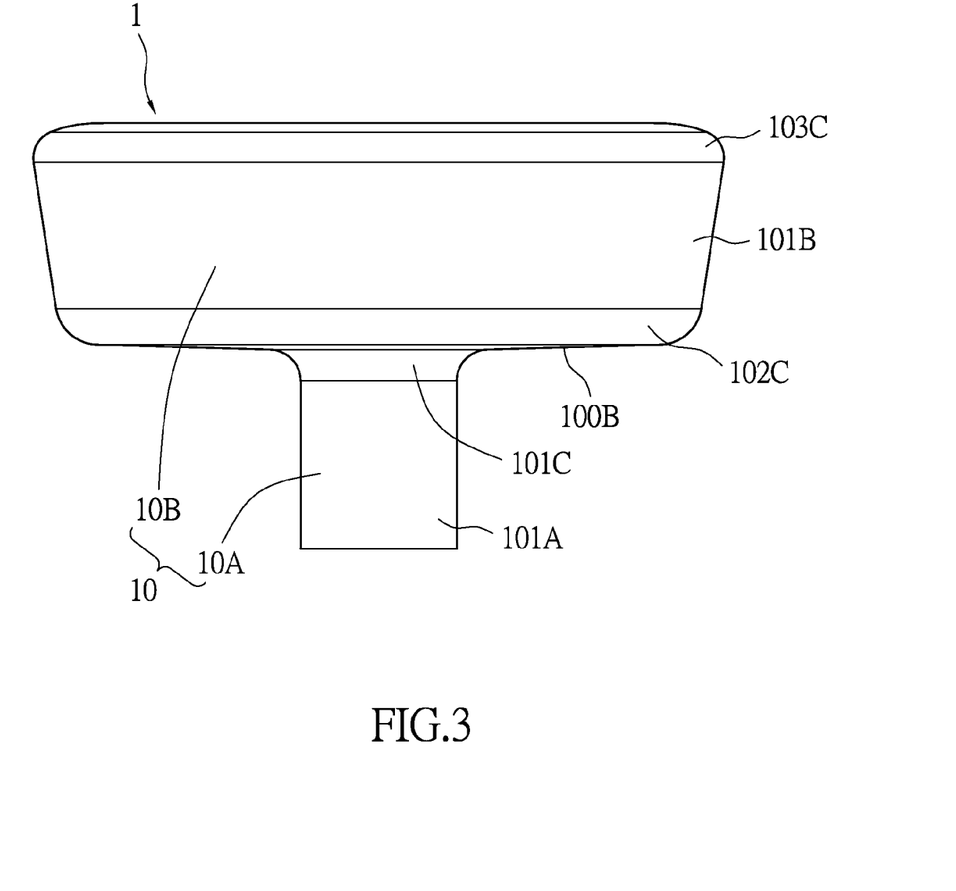
FIG. 3 shows a lateral, schematic view of the light-guiding unit of the instant disclosure.

For example, referring to FIG. 3, the front view of the single light-guiding element 10 is shown as a T-shaped transparent body, and the columnar body 10A of the single light-guiding element 10 may be a vertical cylinder, where the uniform diameter of the columnar body 10A is 0.2 to 0.5 time the maximum diameter of the expansion body 10B. In addition, referring to FIG. 4, the expansion body 10B has a cross section shown as a fishtail shape, thus the cross-sectional view of the expansion body 10B is shown as a fishtail-shaped body.

Figure 5:
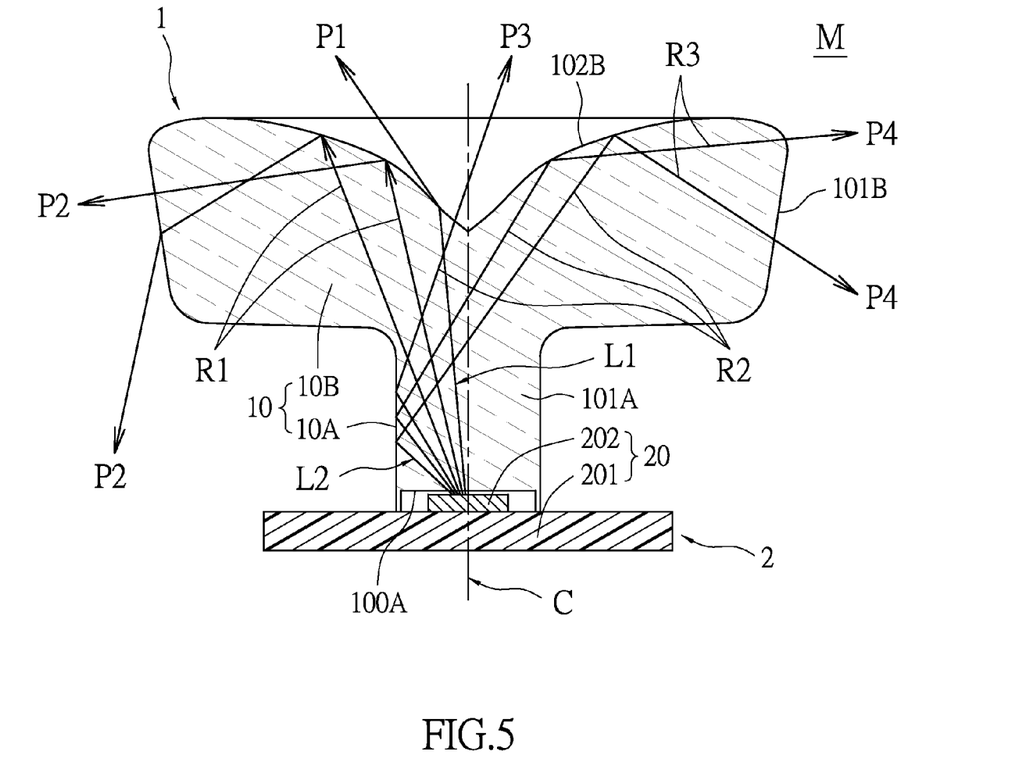
FIG. 5 shows an optical-simulation, schematic view of the light-guiding unit of the light-guiding structure of the instant disclosure.
Figure 6:
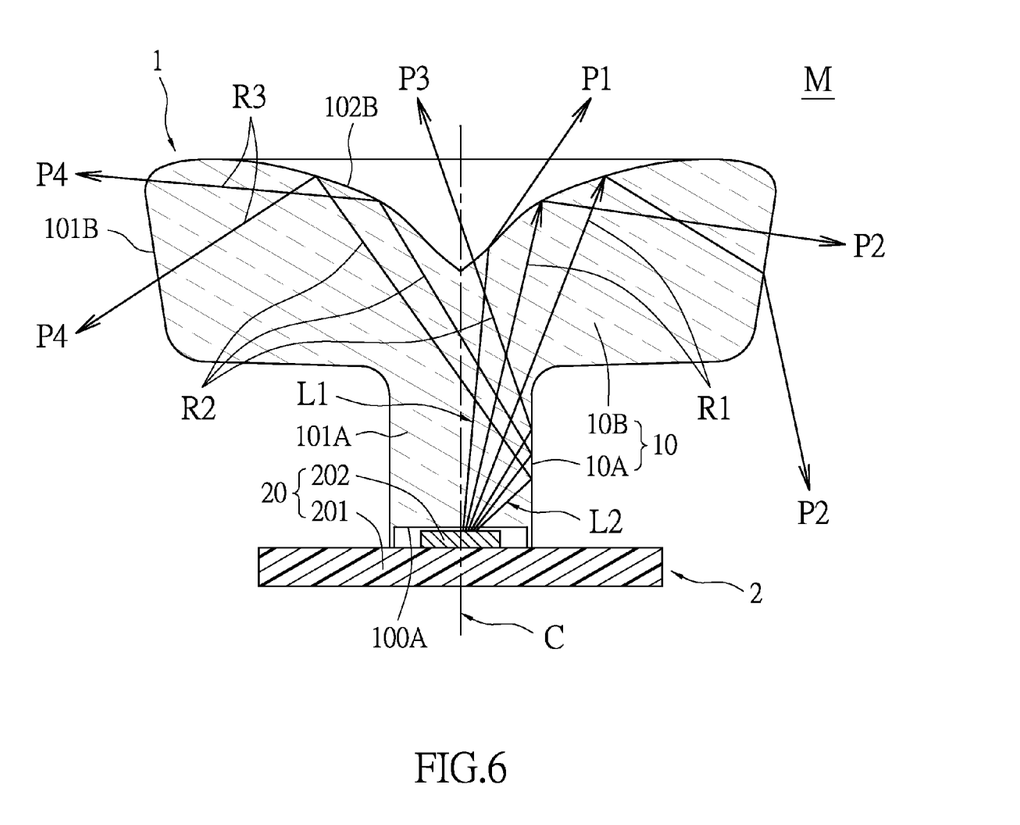
FIG. 6 shows another optical-simulation, schematic view of the light-guiding unit of the light-guiding structure of the instant disclosure.

Furthermore, the light-emitting unit 2 includes at least one light-emitting module 20 adjacent to the light input surface 100A of the columnar body 10A. The at least one light-emitting module 20 includes a circuit substrate 201 and at least one LED 202 disposed on the circuit substrate 201 and electrically connected to the circuit substrate 201 (for example, the LED 202 includes at least one LED chip and a package resin body for enclosing the LED chip), and the single light-guiding element 10 is disposed on the circuit substrate 201 to cover the at least one LED 202 as shown in FIG. 5 and FIG. 6. More precisely, the columnar body 10A has a planar bottom surface 102A connected to the vertical surrounding peripheral surface 101A and a concave space 103A concaved inwardly from the planar bottom surface 102A for receiving the at least one LED 202, and the light input surface 100A is formed inside the concave space 103A.

Moreover, referring to FIG. 5 and FIG. 6, both the columnar body 10A and the expansion body 10B share the same center line C. The first incident light beams L1 generated by the at least one light-emitting module 20 each has a first predetermined incident angle (not labeled) relative to the center line C, the second incident light beams L2 generated by the at least one light-emitting module 20 each has a second predetermined incident angle (not labeled) relative to the center line C, and the first predetermined incident of the first incident light beam L1 is small than the second predetermined incident of the second incident light beam L2.

More precisely, referring to FIG. 5 and FIG. 6, the first incident light beams L1 are projected toward the trumpet-shaped top surface 102B, where (1) some of the first incident light beams L1 can directly pass through the trumpet-shaped top surface 102B to form first outgoing light beams P1 that are projected outwardly from the trumpet-shaped top surface 102B of the single light-guiding element 10, and (2) the other first incident light beams L1 can be reflected by the trumpet-shaped top surface 102B to form first reflected light beams R1, and the first reflected light beams R1 can directly pass through the inclined surrounding peripheral surface 101B to form second outgoing light beams P2 that are projected outwardly from the inclined surrounding peripheral surface 101B of the single light-guiding element 10. In addition, some of the second outgoing light beams P2 can provide a lateral projection light source, and the other second outgoing light beams P2 can provide a downward projection light source.

Figure 7:
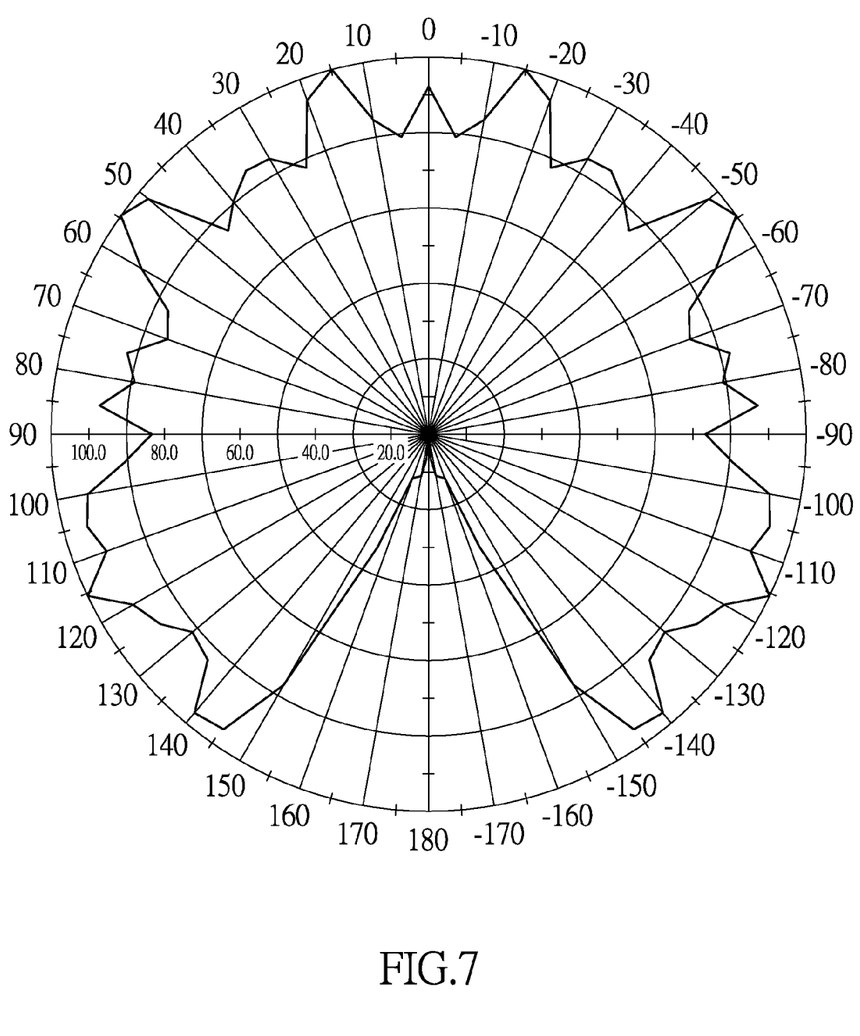
FIG. 7 shows a luminous intensity distribution curve diagram of the light-guiding structure of the instant disclosure.

More precisely, referring to FIG. 5 and FIG. 6, the second incident light beams L2 are reflected by the vertical surrounding peripheral surface 101A to form second reflected light beams R2, and the second reflected light beams R2 are projected toward the trumpet-shaped top surface 120B, where (1) some of the second reflected light beams R2 can directly pass through the trumpet-shaped top surface 102B to form third outgoing light beams P3 that are projected outwardly from the trumpet-shaped top surface 102B of the single light-guiding element 10, and (2) the other second reflected light beams R2 can be reflected by the trumpet-shaped top surface 102B to form third reflected light beams R3, and the third reflected light beams R3 can directly pass through the inclined surrounding peripheral surface 101B to form fourth outgoing light beams P4 that are projected outwardly from the inclined surrounding peripheral surface 101B of the single light-guiding element 10. In addition, some of the fourth outgoing light beams P4 can provide an inclined and upward projection light source, and the other fourth outgoing light beams P4 can provide an inclined and downward projection light source. Whereby, referring to FIG. 7, the viewing angle of the instant disclosure may reach 280°, and the lumen between 135° to 180° accounts for 6% or above of the total lumen. Furthermore, the light intensity distribution between 0° to 135° may fall in 20% of the average light intensity between 0° to 135°.

Figure 8:
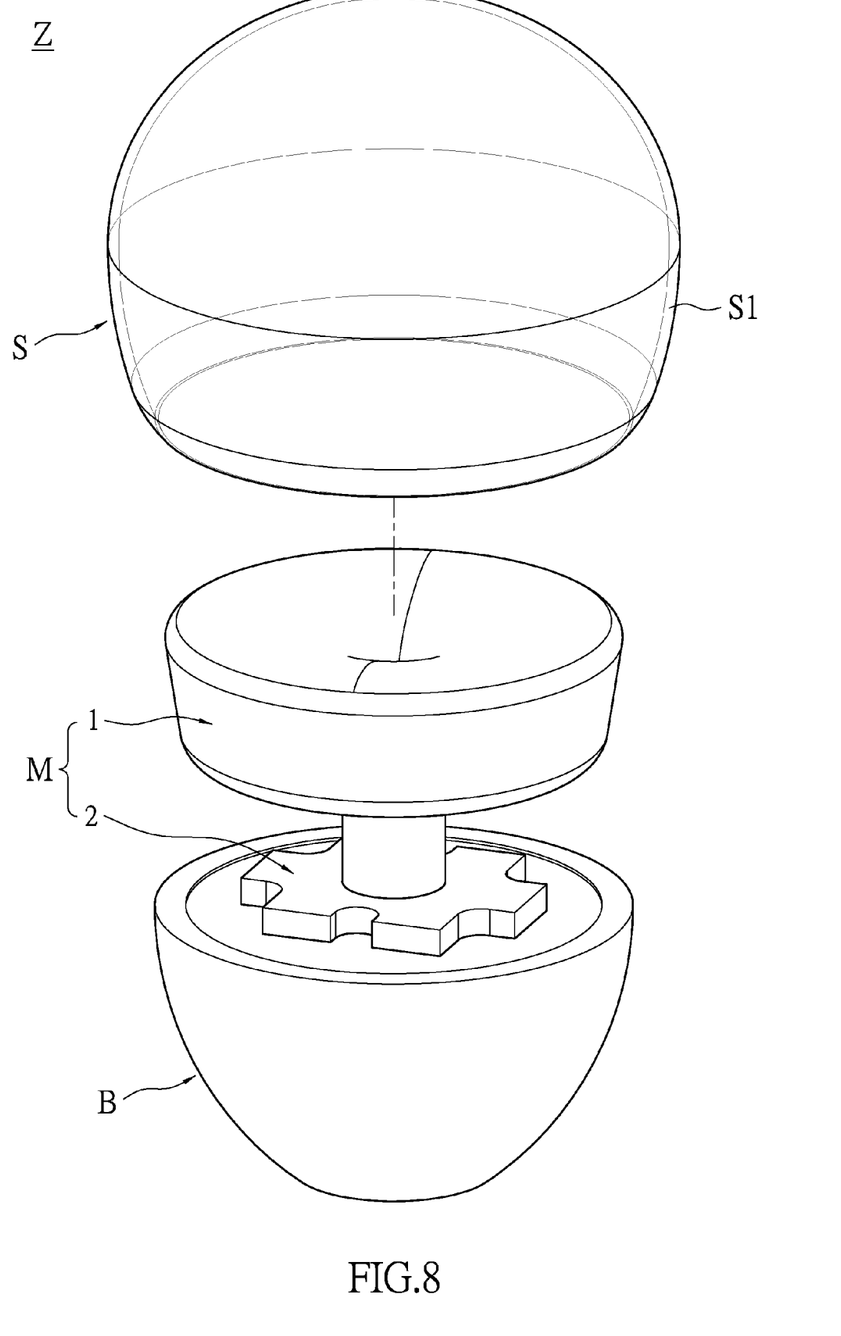
FIG. 8 shows a partial, exploded, schematic view of the light-emitting device of the instant disclosure.
Figure 9:
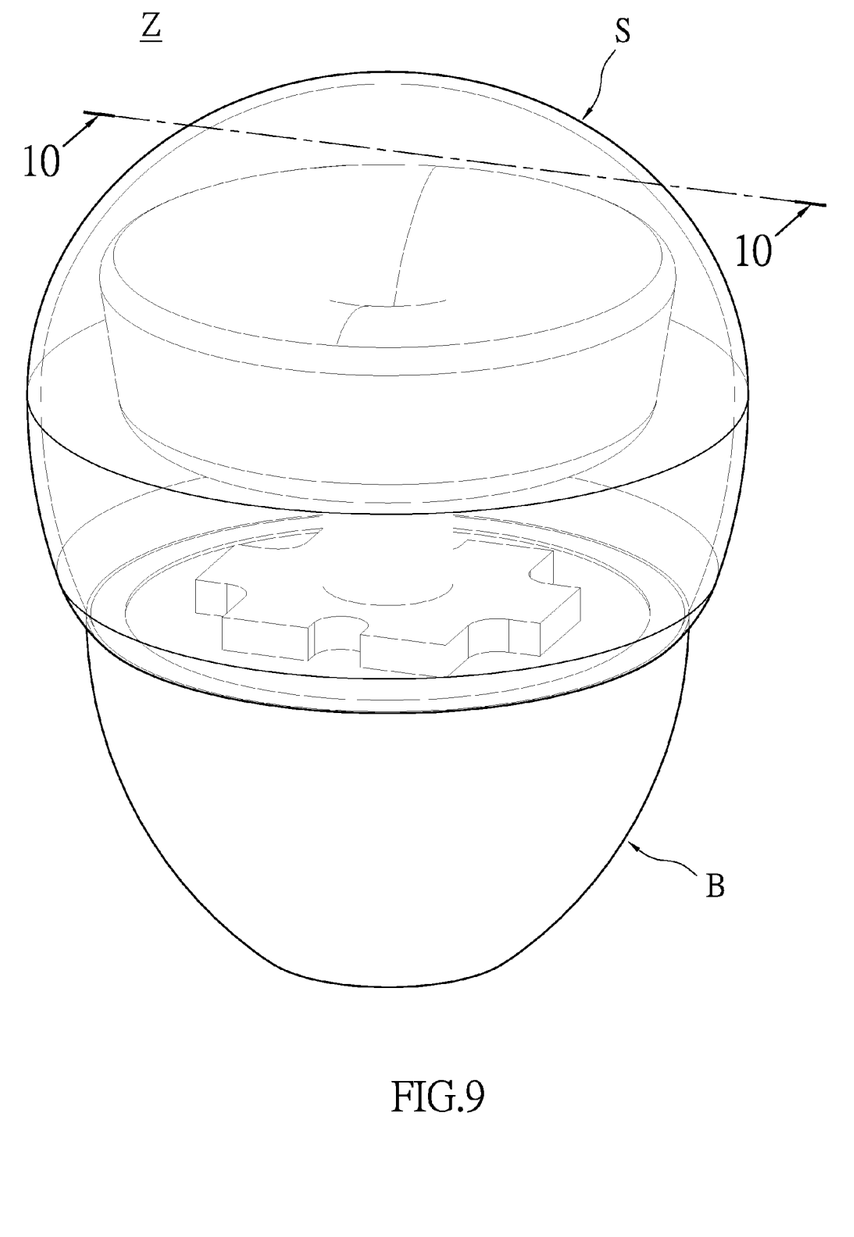
FIG. 9 shows an assembled, schematic view of the light-emitting device of the instant disclosure.
Figure 10:
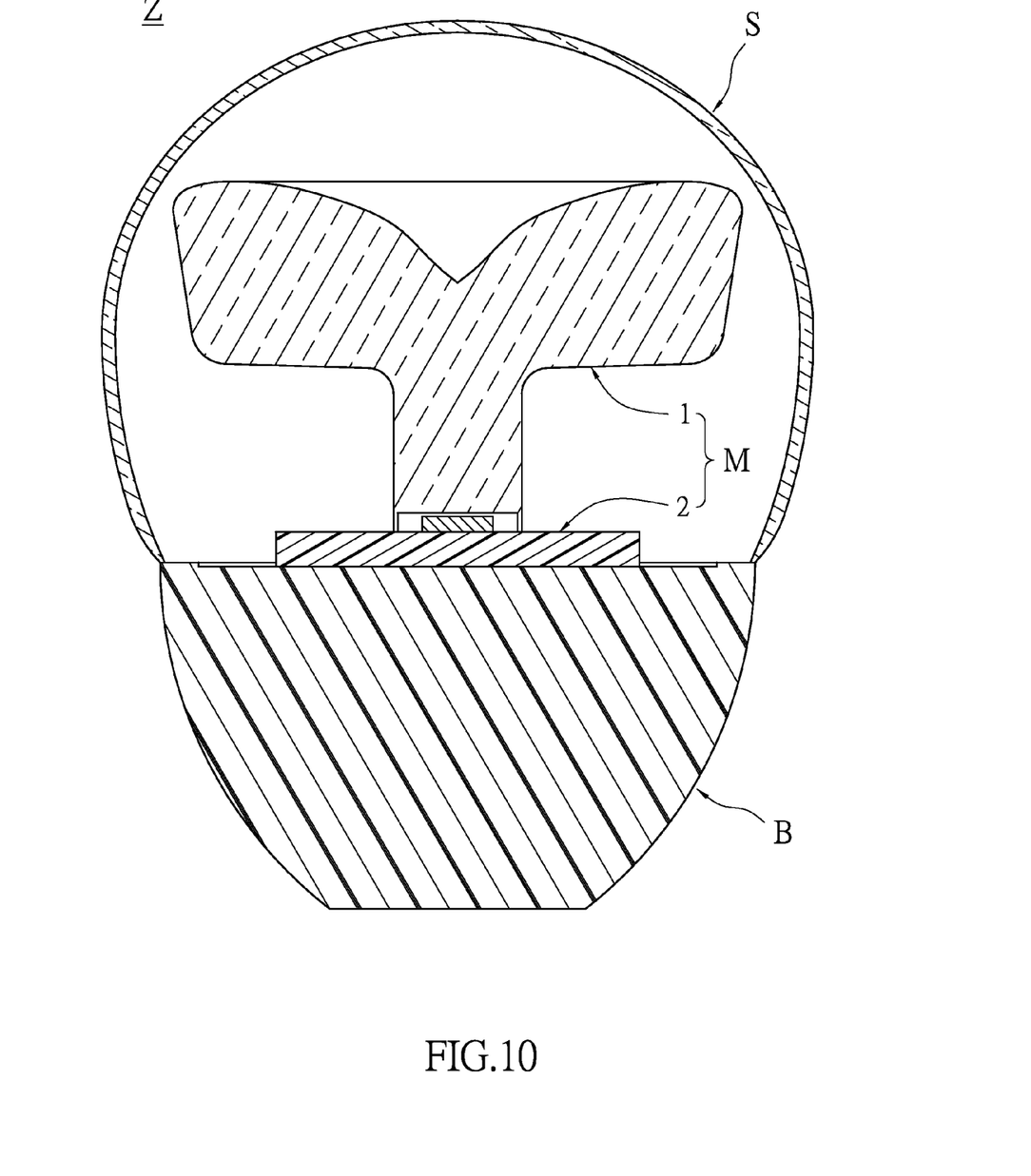
FIG. 10 shows a cross-sectional view taken along the section line 10-10 of FIG. 9.

Referring to FIG. 8 to FIG. 10, the instant disclosure provides a light-emitting device Z, comprising a base unit B, a light-guiding structure M and a cover unit S. The light-guiding structure M is disposed on the base unit B, and the cover unit S includes a light-transmitting cover body S1 disposed on the base unit B to cover the light-guiding structure M. More precisely, the light-guiding structure M includes a light-guiding unit 1 and a light-emitting unit 2.

Figure 4:
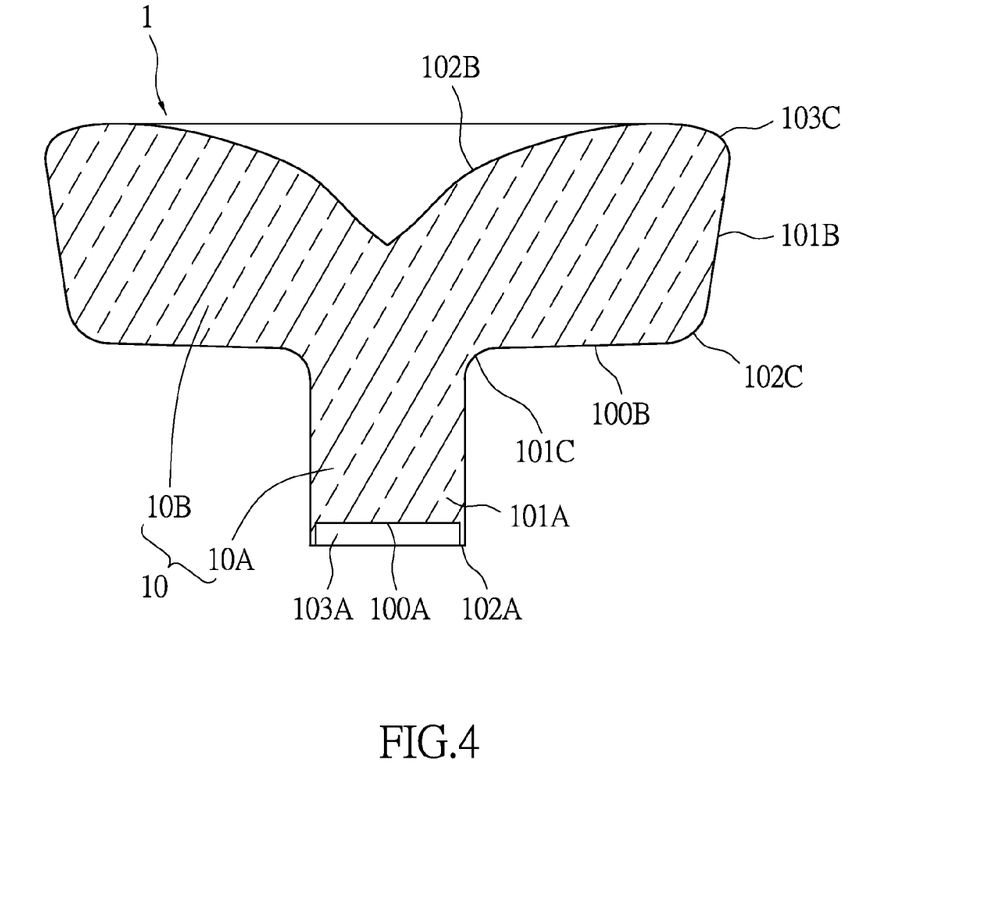
FIG. 4 shows a cross-sectional view taken along the section line 4-4 of FIG. 1.

Referring to FIG. 4, the light-guiding unit 1 includes a single light-guiding element 10, and the single light-guiding element 10 has a columnar body 10A and an expansion body 10B integrally and upwardly extended from the columnar body 10A. The columnar body 10A has a light input surface 100A and a vertical surrounding peripheral surface 101A, and the expansion body 10B has a surrounding bottom surface 100B connected with the vertical surrounding peripheral surface 101A, an inclined surrounding peripheral surface 101B connected with the surrounding bottom surface 100B, and a trumpet-shaped top surface 102B connected with the inclined surrounding peripheral surface 101B. In addition, the light-emitting unit 2 includes at least one light-emitting module 20 adjacent to the light input surface 100A of the columnar body 10A, and the at least one light-emitting module 20 includes a circuit substrate 201 and at least one LED 202 disposed on the circuit substrate 201 and electrically connected to the circuit substrate 201.

In conclusion, because the single light-guiding element 10 has a columnar body 10A and an expansion body 10B integrally and upwardly extended from the columnar body 10A, the viewing angle of the light-guiding structure M and the light-emitting device Z of the instant disclosure can be increased over 180 degrees.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A light-guiding structure, comprising:
a light-guiding unit including a single light-guiding element, wherein the single light-guiding element has a columnar body and an expansion body integrally and upwardly extended from the columnar body, the columnar body has a light input surface and a vertical surrounding peripheral surface, and the expansion body has a surrounding bottom planar surface connected with the vertical surrounding peripheral surface and sloped to the vertical surrounding peripheral surface, an arc-shaped surrounding corner surface connected with the surrounding bottom planar surface, an inclined surrounding peripheral planar surface connected with the arc-shaped surrounding corner surface and sloped to the surrounding bottom surface, and a trumpet-shaped top surface connected with the inclined surrounding peripheral planar surface; and
a light-emitting unit including at least one light-emitting module adjacent to the light input surface of the columnar body.

2. The light-guiding structure of claim 1, wherein the columnar body is a vertical cylinder, and the expansion body has a cross section shown as a fishtail shape.

3. The light-guiding structure of claim 1, wherein both the columnar body and the expansion body share the same center line, first incident light beams generated by the at least one light-emitting module each has a first predetermined incident angle relative to the center line, second incident light beams generated by the at least one light-emitting module each has a second predetermined incident angle relative to the center line, and the first predetermined incident of the first incident light beam is small than the second predetermined incident of the second incident light beam, wherein the first incident light beams are projected toward the trumpet-shaped top surface, some of the first incident light beams directly pass through the trumpet-shaped top surface to form first outgoing light beams, the other first incident light beams are reflected by the trumpet-shaped top surface to form first reflected light beams, and the first reflected light beams directly pass through the inclined surrounding peripheral planar surface to form second outgoing light beams, wherein the second incident light beams are reflected by the vertical surrounding peripheral surface to form second reflected light beams, the second reflected light beams are projected toward the trumpet-shaped top surface, some of the second reflected light beams directly pass through the trumpet-shaped top surface to form third outgoing light beams, the other second reflected light beams are reflected by the trumpet-shaped top surface to form third reflected light beams, and the third reflected light beams directly pass through the inclined surrounding peripheral planar surface to form fourth outgoing light beams, wherein the viewing angle of the first, the second, the third, and the fourth outgoing light beams reaches 280°, the lumen between 135° to 180° accounts for 6% or above of the total lumen of the viewing angle of 280°, and the light intensity distribution between 0° to 135° falls in 20% of the average light intensity between 0° to 135°.

4. The light-guiding structure of claim 1, wherein the single light-guiding element is a T-shaped transparent body, the at least one light-emitting module includes a circuit substrate and at least one LED disposed on the circuit substrate and electrically connected to the circuit substrate, and the single light-guiding element is disposed on the circuit substrate to cover the at least one LED.

5. The light-guiding structure of claim 4, wherein the columnar body has a planar bottom surface connected to the vertical surrounding peripheral surface and a concave space concaved inwardly from the planar bottom surface for receiving the at least one LED, and the light input surface is formed inside the concave space.

6. A light-emitting device, comprising:
a base unit;
a light-guiding structure disposed on the base unit, wherein the light-guiding structure includes a light-guiding unit and a light-emitting unit; and
a cover unit including a light-transmitting cover body disposed on the base unit to cover the light-guiding structure;
wherein the light-guiding unit includes a single light-guiding element, the single light-guiding element has a columnar body and an expansion body integrally and upwardly extended from the columnar body, the columnar body has a light input surface and a vertical surrounding peripheral surface, and the expansion body has a surrounding bottom planar surface connected with the vertical surrounding peripheral surface, an arc-shaped surrounding corner surface connected with the surrounding bottom planar surface, an inclined surrounding peripheral planar surface connected with the arc-shaped surrounding corner surface and sloped to the surrounding bottom surface, and a trumpet-shaped top surface connected with the inclined surrounding peripheral planar surface, wherein the light-emitting unit includes at least one light-emitting module adjacent to the light input surface of the columnar body.

7. The light-emitting device of claim 6, wherein the columnar body is a vertical cylinder, and the expansion body has a cross section shown as a fishtail shape.

8. The light-emitting device of claim 6, wherein both the columnar body and the expansion body share the same center line, first incident light beams generated by the at least one light-emitting module each has a first predetermined incident angle relative to the center line, second incident light beams generated by the at least one light-emitting module each has a second predetermined incident angle relative to the center line, and the first predetermined incident of the first incident light beam is small than the second predetermined incident of the second incident light beam, wherein the first incident light beams are projected toward the trumpet-shaped top surface, some of the first incident light beams directly pass through the trumpet-shaped top surface to form first outgoing light beams, the other first incident light beams are reflected by the trumpet-shaped top surface to form first reflected light beams, and the first reflected light beams directly pass through the inclined surrounding peripheral planar surface to form second outgoing light beams, wherein the second incident light beams are reflected by the vertical surrounding peripheral surface to form second reflected light beams, the second reflected light beams are projected toward the trumpet-shaped top surface, some of the second reflected light beams directly pass through the trumpet-shaped top surface to form third outgoing light beams, the other second reflected light beams are reflected by the trumpet-shaped top surface to form third reflected light beams, and the third reflected light beams directly pass through the inclined surrounding peripheral planar surface to form fourth outgoing light beams, wherein the viewing angle of the first, the second, the third, and the fourth outgoing light beams reaches 280°, the lumen between 135° to 180° accounts for 6% or above of the total lumen of the viewing angle of 280°, and the light intensity distribution between 0° to 135° falls in 20% of the average light intensity between 0° to 135°.

9. The light-emitting device of claim 6, wherein the single light-guiding element is a T-shaped transparent body, the at least one light-emitting module includes a circuit substrate and at least one LED disposed on the circuit substrate and electrically connected to the circuit substrate, and the single light-guiding element is disposed on the circuit substrate to cover the at least one LED.

10. The light-emitting device of claim 9, wherein the columnar body has a planar bottom surface connected to the vertical surrounding peripheral surface and a concave space concaved inwardly from the planar bottom surface for receiving the at least one LED, and the light input surface is formed inside the concave space.

\* \* \* \* \*